US011858186B2

(12) United States Patent
Fux

(10) Patent No.: US 11,858,186 B2
(45) Date of Patent: Jan. 2, 2024

(54) APPARATUS FOR FEEDING SINGLE GRAINS TO A PROCESSING MACHINE, IN PARTICULAR AN INJECTION MOLDING MACHINE

(71) Applicant: WITTMANN TECHNOLOGY GMBH, Vienna (AT)

(72) Inventor: Erhard Fux, Vienna (AT)

(73) Assignee: WITTMANN TECHNOLOGY GMBH, Vienna (AT)

( * ) Notice: Subject to any disclaimer, the term of this patent is extended or adjusted under 35 U.S.C. 154(b) by 226 days.

(21) Appl. No.: 16/635,809

(22) PCT Filed: Aug. 1, 2018

(86) PCT No.: PCT/AT2018/060172
§ 371 (c)(1),
(2) Date: Sep. 28, 2020

(87) PCT Pub. No.: WO2019/023730
PCT Pub. Date: Feb. 7, 2019

(65) Prior Publication Data
US 2021/0008772 A1 Jan. 14, 2021

(30) Foreign Application Priority Data
Aug. 3, 2017 (AT) .............................. A 50647/2017

(51) Int. Cl.
*B29C 45/18* (2006.01)
*B29B 7/24* (2006.01)
*B29C 31/06* (2006.01)
(52) U.S. Cl.
CPC .......... *B29C 45/1808* (2013.01); *B29B 7/242* (2013.01); *B29C 31/06* (2013.01)
(58) Field of Classification Search
CPC ...... B29C 45/1808; B29C 31/06; B29B 7/242
(Continued)

(56) References Cited

U.S. PATENT DOCUMENTS 2,923,965 A * 2/1960 Djuvik .................. C22B 1/2406
425/222
4,691,867 A * 9/1987 Iwako ................. B01F 27/2711
241/101.8
(Continued)

FOREIGN PATENT DOCUMENTS

CN 102349382 A * 2/2012
CN 104541696 A * 4/2015
(Continued)

OTHER PUBLICATIONS

Machine translation JP-06190831-A (Year: 1994).*
(Continued)

*Primary Examiner* — Matthew J Daniels
*Assistant Examiner* — Wayne K. Swier
(74) *Attorney, Agent, or Firm* — GREENBLUM & BERNSTEIN, P.L.C.

(57) ABSTRACT

Apparatus for feeding single grains to one or more processing machines comprising at least one singulating device, a granular material reservoir for a bulk material, and a feeding device for feeding the singulated bulk material to the injection molding machine. The singulating device is formed from a singulating disk provided with suction openings distributed over the pitch circle. On one side of the singulating disk, the granular material reservoir is arranged to hold bulk material. Via the shaft, the singulating disk is mounted to be rotated with the suction openings for receiving and dispensing grains. Furthermore, a grain scraper and/or a grain aligner for the bulk material or grains is arranged on the singulating disk in order to scrape off the grains and/or align the grains, or a stirring or carry-along element is arranged on the singulating disk for receiving the bulk material or on the shaft.

16 Claims, 2 Drawing Sheets

Figure 1:
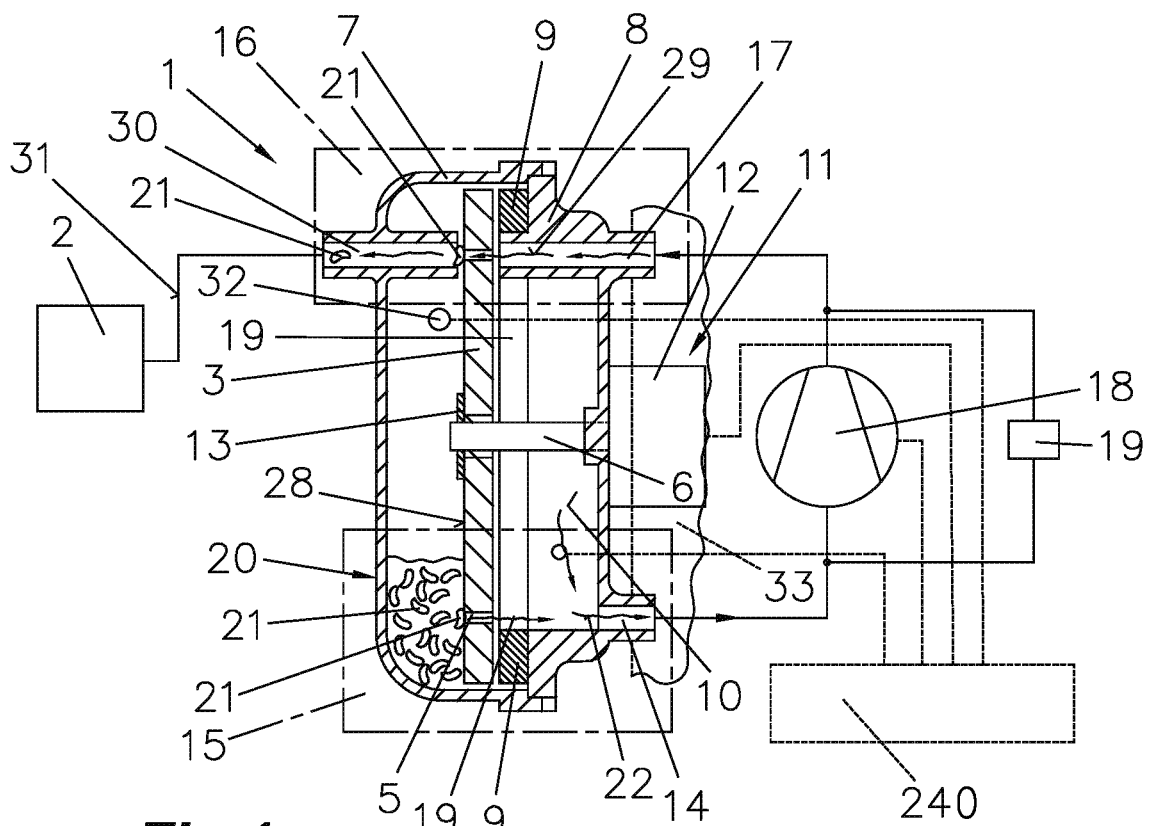

(58) Field of Classification Search
USPC ......................................................... 425/526
See application file for complete search history.

(56) References Cited

U.S. PATENT DOCUMENTS

| | | | | |
|---|---|---|---|---|
| 6,402,363 B1 * | 6/2002 | Maguire | ............... | B29C 48/288 |
| | | | | 177/184 |
| 2008/0049546 A1 | 2/2008 | O'Callaghan | | |

FOREIGN PATENT DOCUMENTS

| | | | | |
|---|---|---|---|---|
| DE | 195 28 636 | | 2/1997 | |
| DE | 696 27 717 | | 1/2004 | |
| GB | 581642 | * | 10/1946 | |
| JP | H06 8242 | | 1/1994 | |
| JP | 06190831 A | * | 7/1994 | |
| JP | H06 190831 | | 7/1994 | |
| WO | WO-2008154855 A1 | * | 12/2008 | ............. A01C 7/046 |

OTHER PUBLICATIONS

Machine translation CN-102349382-A (Year: 2012).*
What is a Weir Plate? : https://www.openchannelflow.com/support/ (Year: 2016).*
Machine translation WO2008154855A1 (Year: 2008).*
Machine translation CN104541696A (Year: 2015).*
Int'l Search Report (Form PCT/ISA/210) conducted in Int'l Application No. PCT/AT2018/060172 (dated Nov. 15, 2018) (w/ English translation).
Int'l Written Opinion (Form PCT/ISA/237) conducted in Int'l Application No. PCT/AT2018/060172 (dated Nov. 15, 2018).

* cited by examiner

APPARATUS FOR FEEDING SINGLE GRAINS TO A PROCESSING MACHINE, IN PARTICULAR AN INJECTION MOLDING MACHINE

The invention relates to an apparatus for feeding single grains to a processing machine, in particular an injection molding machine, as is described in Claim 1.

Methods for supplying bulk material are already known in which, for example, plastic granular material is supplied by the conveying apparatus prior to the dosing in bins.

A singulating system for granular material is thereby known from JPH06190831A, in which system a singulating disk for receiving the grain is arranged. The grain is thereby received via suction openings using negative pressure from a grain reservoir through which the singulating disk is rotated. Through an overpressure, the received grain is blown from the singulating disk into an associated supply line.

A disadvantage in this case is that, with a design of this type, it is not possible to ensure that only one grain is ever delivered per suction opening.

From DE 195 28 636 A1, an apparatus for conveying and dosing bulk material is known in which the dosing instrument simultaneously serves as a conveying instrument.

In addition, a conveying apparatus that comprises multiple bins is known from US 2008/049546 A1.

Furthermore, a method and a gravimetric mixer for dispensing measured amounts of granular materials and colorants, in particular pigments in liquid form, is known from DE 696 27 717 T2.

As already illustrated at the outset, different amounts of different plastic granular materials are filled in batches according to freely adjustable formulas, and each individual type of plastic granular material, such as for example virgin material, masterbatch, additives and/or grinding stock, is successively or simultaneously released into a weighing bin or mixing bin, depending on the system, from a material hopper via a material valve.

In the majority of cases, the plastic granular material in the form of bulk material is to be singulated using the apparatus and/or dosing device, which means that with a masterbatch, for example, one grain at a time is fed to the processing operation.

The object of the invention is therefore to create an apparatus of the type named at the outset with which on the one hand a conveyance of single grains and on the other hand also a high level of dosing accuracy with the smallest possible variances are possible.

The object is attained by the invention.

The apparatus according to the invention is characterized in that a grain scraper and/or a grain aligner for the bulk material or grains is arranged on the singulating disk in order to scrape off the grains and/or align the grains, or a stirring or carry-along element is arranged on the singulating disk for receiving the bulk material or on the shaft.

Here, it is advantageous that, through the arrangement of a grain scraper and/or a grain aligner, it is possible to ensure that any snagged pellets or grains are scraped off via the scraping elements and/or aligning elements before the dispensing or after the removal of the singulated grain, so that only a single grain ever reaches the blow-off nozzle. It is also achieved that, in the case of special grain geometry, an appropriate alignment takes place so that a reliable removal and further transport to the injection molding machine can occur. In order to ensure that single grains are fed, it is also possible to arrange a stirring or carry-along element on the singulating disk for receiving the bulk material or on the shaft. It is thus achieved that, as a result of the stirring or carry-along element, the bulk material is thoroughly mixed and is moved in the direction of the suction bores in order to prevent arching in the grain receiving region and reservoir, so that reliable suction via the suction openings is ensured.

With a design of this type, a reliable singulating process can be carried out, since only one piece of bulk material, in particular a pellet or grain, is suctioned at each suction opening. For this purpose, the diameter of the suction opening is preferably adapted to the size of the bulk material, which means that different singulating disks with corresponding suction bores are used for differently sized grains, so that when the bulk material is changed, the singulating disk is also changed at the same time. Another advantage is that, because the singulating disk passes through the granular material reservoir, it is ensured that a grain is always received, since the passage through the granular material reservoir, that is, the contact with the grains, is a longer phase, and a feed does not take place in a small region, in particular at isolated points. Furthermore, it is advantageous that a precise dosing is possible for the injection molding process of an injection molding machine with the singulating disks. For this purpose, the injection molding machine provides a release for the dosing, for example, so that all further steps are controlled by the dosing instrument controller of the apparatus, that is, by the single-grain dosing instrument. However, it is possible that all equipment is connected through a bus controller, via which the release and possible parameterizations are preset from the injection molding machine.

One embodiment is advantageous in which one or more load cells for measuring the weight of the bulk material contained are arranged in the region of the granular material reservoir, or that the entire apparatus is arranged on load cells or a weighing device for determining the weight of the bulk material filled or of the grains or of the entire apparatus. It is thus achieved that the mass of singulated and fed bulk material can be determined according to the loss-in-weight principle, and that a precise feed of bulk material by weight is thus possible. The refilling of bulk material into the granular material reservoir can thus also be automated. For example, an automation of the refilling of bulk material is easily possible since a minimum weight of the equipment, including the granular material reservoir(s), can be ascertained, so that a filling-up procedure occurs up to a target weight after the weight falls below this minimum weight. It is thus simultaneously ensured that sufficient bulk material is always contained in the granular material reservoir, since an error message is outputted and/or the system is shut down if the material falls below the minimum weight and is not refilled. This function can also be attained using a capacitive sensor. It is therefore essential to measure/determine the grain weight ratio and to establish it for the controller.

In one embodiment, it is advantageous that, in the upper region, in particular in the grain discharge region of the singulating disk, a blow-off nozzle is arranged which is connected to the feeding device, or feeder, in particular a supply line, for feeding the singulated grain to the injection molding machine. In this manner, it is possible that exactly one or a specific quantity of bulk material, in particular pellets or grains, can be fed for each injection molding procedure, wherein the bulk material is always withdrawn individually. However, it is also possible that the blow-off nozzle, in particular the feed line to the injection molding machine, is connected to a negative-pressure or vacuum-suction means so that, for a faster and more reliable withdrawal of the bulk material, said bulk material is also sucked-in. It is also possible that a pressure conveying means is used for transporting the grain. In this case, a continuous operation of the negative-pressure or vacuum-suction means and/or of the pressure conveying means is possible, or the pressure can be increased for each withdrawal of bulk material, that is, a pulsed operation. However, it is also possible that the grain is discharged and fed solely by gravity, wherein for this purpose the upper region, in particular the grain exit region, is embodied to be unpressurized.

However, one embodiment is also advantageous in which an overpressure opening is arranged in or a blow-off nozzle extends into the grain discharge region, wherein the blow-off nozzle is separated from the negative-pressure region, in particular from a negative-pressure chamber. It is thus achieved that the air suctioned away from the negative-pressure region can be blown-in via the overpressure opening, so that in the case of an opposing opening of the singulating disk, the bulk material suctioned thereonto is blown off. In this manner, it is achieved that two functions, namely the suctioning-onto and the blowing-off of the bulk material, in particular of the singulated grain, are achieved using one compressor, as a consequence of which energy can be saved. The position of the overpressure opening is such that, when the singulating disk is rotated along with the received bulk material, the suction openings thereof are correspondingly moved past the overpressure opening so that, as a result of the blowing-in of air, the bulk material is reliably detached from the singulating disk and a very high level of operational reliability is ensured.

However, one embodiment is also advantageous in which the granular material reservoir, in particular the grain receiving region, is connected to a, preferably automatic, plastic granular material feed. In this manner, it is achieved that an automatic refilling is possible when the bulk material falls below a presettable fill level. It is thus also always ensured that the sufficient amount of material is present in the housing of the apparatus, and that the suction holes of the singulating disks can thus receive grains.

One embodiment is advantageous in which the singulating disk for the bulk material or grain has a diameter of maximally 300 mm. It is thus achieved that, as a result of the diameter, a sufficient passage through the material reservoir is enabled for the purpose of improved grain receiving.

One embodiment is advantageous in which the singulating disk protrudes into the granular material reservoir in the lower region, in particular in a grain receiving region, or is arranged in said region. As a result, it is achieved that the suction holes or suction bore are always covered with grains of the bulk material, so that a reliable receiving is ensured at every suction opening.

Finally, one embodiment is advantageous in which the singulating disk for receiving the bulk material, in particular below the grain discharge region, a suction closing element for closing off one or more suction openings without grains is arranged on the front or rear side of the singulating disk. It is thus achieved that, for the suction openings that have already dispensed the grain, but which have not yet dipped into the granular material reservoir, the inflow of air is impeded or prevented.

The invention is explained in greater detail by means of an exemplary embodiment illustrated in multiple drawings, wherein the invention is not limited to the exemplary embodiment shown.

Figure 2:
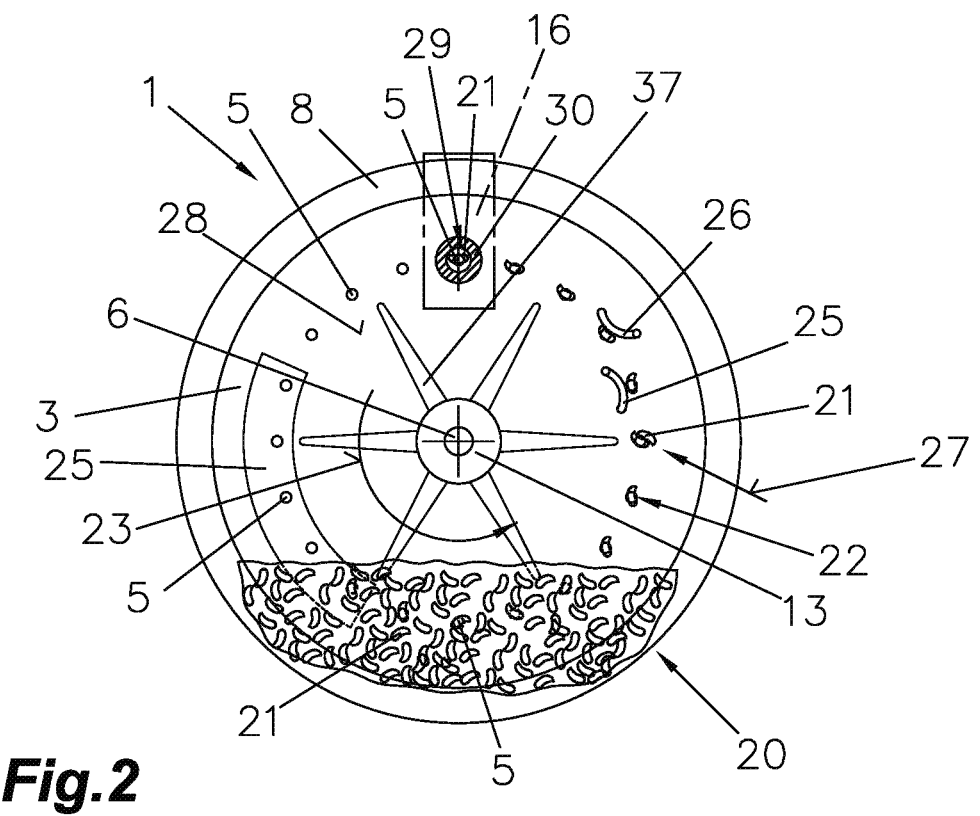
Figure 3:
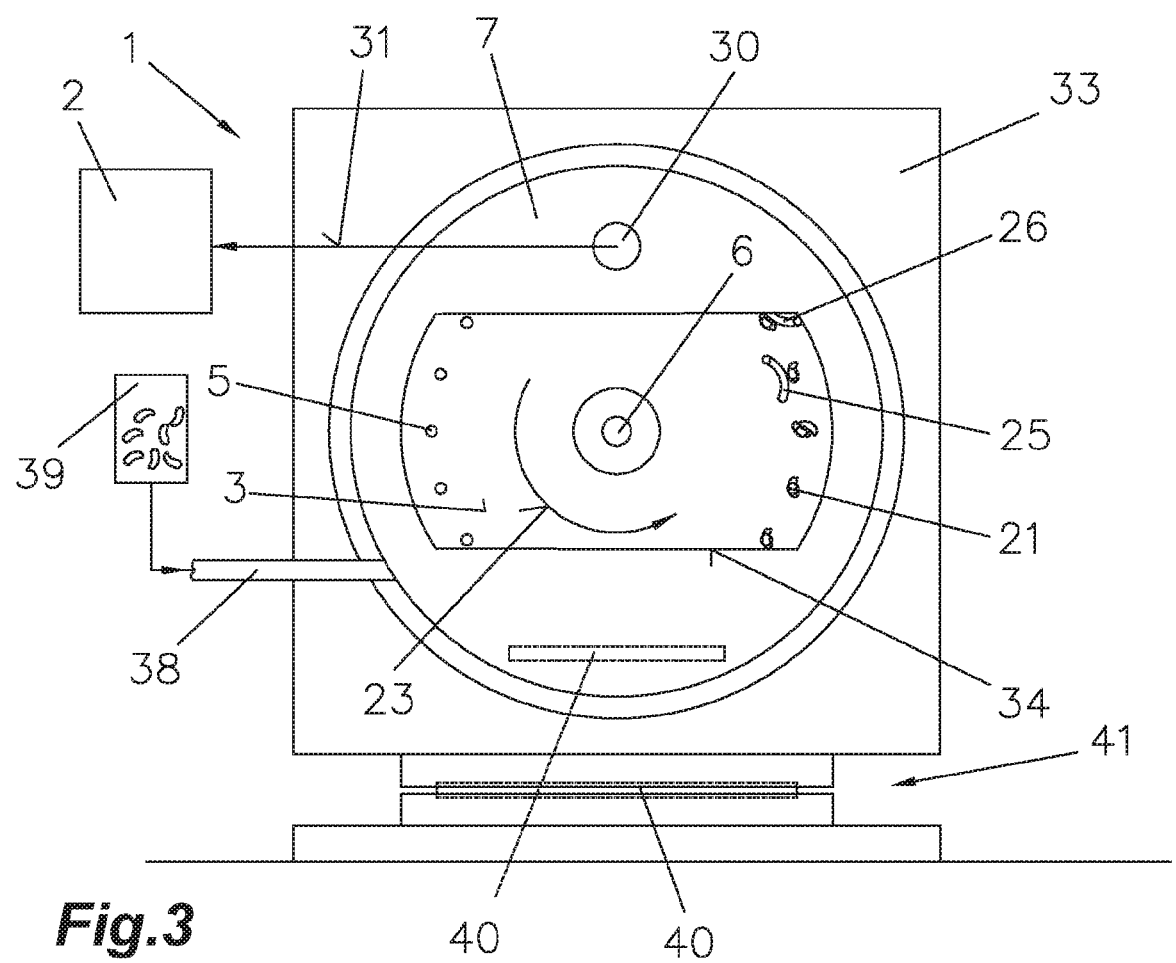

The following show:

FIG. 1 A section through the apparatus in a simplified schematic illustration;

FIG. 2 A section through a further exemplary embodiment of an apparatus with an additional covering element, in a simplified schematic illustration;

FIG. 3 A front view of the assembled apparatus, in particular according to FIGS. 1 and 2, and a housing for the controller, motors, compressor, etc., in a simplified schematic illustration.

It is noted at the outset that, in the different embodiments, identical parts are provided with identical reference numerals or identical component part designations, wherein the disclosures contained in the entire specification can analogously be applied to identical parts with identical reference numerals or identical component part designations. The positions chosen to be disclosed in the specification, such as top, bottom, side, etc., for example, also relate to the descriptive figure and, where there is a change in position, can be applied accordingly to the new position. Individual features or combinations of features from the exemplary embodiments shown and described can also constitute independent inventive solutions in their own right.

It should be generally noted in regard to the exemplary embodiments of FIGS. 1 through 3 that the use of an apparatus 1 of this type preferably applies to feeding single grains to an injection molding machine 2, that is, in injection molding technology.

FIGS. 1 through 3 show the apparatus 1, in particular a single-grain dosing instrument 1, for feeding single grains to a processing machine, in particular to an injection molding machine 2, as schematically illustrated.

The apparatus 1 comprises, at least at the basic level, a singulating device, or singulator, that is formed from a disk, in particular a singulating disk 3. The singulating disk 3 is provided with suction openings 5 distributed over a pitch circle. The singulating disk 3 is mounted on or attached to a shaft 6.

In the exemplary embodiments shown, the apparatus is formed from at least two housing sections 7, 8, which are detachably attached to one another. Each housing section 7, 8 is thereby respectively embodied as a cast aluminum chamber or container chamber. Of course, it is possible that the housing sections 7, 8 can also be composed of different materials.

In the design of the embodiments, it is essential that the second housing section 8 forms a negative-pressure chamber 10. The non-moving negative-pressure chamber 10, in particular the second housing section 8, is simultaneously used for mounting a drive unit 11, or drive, in particular of a stepper motor 12 that directly drives the singulating disk 3, which is preferably formed from stainless steel, via the shaft 6. The singulating disk 3 is connected in a positive fit or force fit to the shaft 6, in particular the motor drive shaft, via a quick-action screw system 13. Furthermore, the negative-pressure chamber 10 or the second housing section 8 in addition also comprises a suction nozzle 14. Preferably, this nozzle is located in a grain receiving region 15 which defines the lower region of the apparatus 1 and is illustrated by dot-dashed lines. Additionally, the negative-pressure chamber 10 or the housing section 8 also has a grain discharge region 16, also illustrated by dot-dashed lines, in which a blow-off nozzle 17 is located, wherein the blow-off nozzle 17, in particular the grain discharge region 16, is arranged such that it is separated from the negative-pressure region 10 in the grain receiving region 15 in an airtight mariner.

Preferably, the suction nozzle 14 is connected to a suction inlet of a negative-pressure generating device, in particular a compressor 18, and the outlet of the compressor 18 or of the negative-pressure generating device is connected to the blow-off nozzle 17. It is thus achieved that, with one compressor 18 for example, both a negative pressure in the grain receiving region 15 and also an overpressure in the grain blow-off region 16 are generated. However, it is of course also possible that two different systems can be used for the two regions.

The negative-pressure generator 18 thereby suctions the air away from the housing, in particular via the pressure chamber 10, so that negative pressure is formed in the region of the suction openings 5 and/or in the pressure chamber 10, and air thus continuously flows in through the suction openings 5. Preferably, the singulating disk 3 is provided with approx. 40 small through bores or suction openings 5, in particular between 0.5 mm and 5 mm, distributed uniformly over a smaller pitch circle diameter. Of course, it is possible that more or fewer through bores or suction openings 5 can be arranged. For a reliable operation of the single-grain conveying means, a bypass system 19 is arranged, as will be explained later, in the region of the negative-pressure generator 18, in which system the negative-pressure generator suctions and discharges a partial airflow, always ambient air, via the bypass line. The bypass system 19 is preferably formed from bezels which define the volume flow rate and suction a partial flow as ambient air where necessary.

A granular material reservoir 20 for bulk material, in particular for individual grains 21, preferably of plastic granular material or plastic pellets or plastic grains 21, is arranged in the grain receiving region 15 in the first housing section 7. The granular material reservoir 20 is thereby arranged frontally on the singulating disk 3, that is, on the surface of the disk, so that the grain 21, in particular the bulk material 21, lies directly against the singulating disk 3. Here, it is essential that at least one, but preferably more, suction openings 5 on the singulating disk 3 dip into the granular material reservoir 20, so that grains 21 can be received accordingly by the suction openings 5.

The apparatus 1, in particular the single-grain dosing instrument 1, functions such that a negative pressure is applied to or generated at the suction nozzle 14, for example via the externally located compressor or negative-pressure generator 18, whereby air or ambient air 22 in the negative-pressure chamber 10 is suctioned away, as schematically indicated by arrows, and a defined airflow is generated in the second housing section 8. Through the negative pressure present, the singulating disk 3 is pressed onto the working seal or sealing element 9, and via the through bores or suction openings 5 on the singulating disk 3, ambient air 22 flows in uniformly from the first housing section 7, which means that the ambient air or air 22 from the atmosphere is suctioned into the negative-pressure chamber 10 through the suction bores 5 of the singulating disk 3 via the first housing section 7, and is suctioned from said chamber by the, preferably external, compressor 18 via the suction nozzle 14. In this case, it is possible that a sensor is arranged in the negative-pressure chamber 10, which sensor is connected to a controller 24. Preferably, the pressure regulation is operated via a bypass system 19 in which the compressor 18 suctions and discharges a partial airflow, always ambient air, via the bypass line.

Because the singulating disk 3 is driven and rotated, the singulating disk 3 and the suction openings 5 located thereon sweep through the plastic granular material or bulk material 21 in the granular material reservoir 20 in the grain receiving region 15. The suction openings 5 arranged on the singulating disk 3 are thereby selected such that, for one suction opening 5, preferably only one grain 21 each is ever suctioned by the inflowing air 22 and, due to the negative pressure present on the singulating disk 3 from the negative-pressure chamber 10 remains stuck, which means that the singulating disk 3 is arranged against the sealing element 9 or the air seal such that the disk can be rotated in the most airtight possible manner, as a result of which sufficient air 22 is sucked-in via the suction openings 5. The more air 22 that can be suctioned, the greater the holding force on a suctioned grain 21 and therefore also the greater the built-up negative pressure.

As a result of the further rotation, according to arrow 23, the path leads to the grain discharge region 16 through individual grain scrapers 24 and/or grain aligners 25. The grain scrapers 24 and/or grain aligners 25 have the task of scraping-off any grain 21 that is adhering and/or adhering to a suction grain 21, as schematically indicated in FIG. 2 by an arrow 27, and/or of aligning the grains 21 in a specific position. The grain scrapers 24 and/or grain aligners 25 are preferably attached to the housing section 7 in a springable and/or rotatable or elastic manner and graze or have a small distance from a front face 28 of the first singulating disk 3. It is also possible that the grain scrapers 24 and/or grain aligners 25 themselves are formed from a spring-elastic material and always return to their starting position again upon being deformed.

If a piece of bulk material 21 or a grain 21 is needed at a processing instrument, in particular the injection molding machine 2, then the singulating disk 3 is further moved by the drive unit 12 such that a grain 21 received by a suction bore 5 is positioned across from the blow-off nozzle 17 so that this one grain 21 is pushed off or blown off of the suction opening 5 via the overpressure 29 generated by the compressor 18. The grain 21 is thereby received in an exit nozzle 30 that is integrated in or arranged on the housing section 7. From there, conveyance is possible to a processing or injection molding machine 2 via a feed device, in particular through a corresponding supply line 31. The blow-off nozzle 17 in principle serves to facilitate the grain discharge, but is also used for cleaning microparticles out of the holes. Here, it is possible that a corresponding request for necessary volumes of material is sent, for example via a bus connection, by the processing machine 2, in particular the controller thereof, whereupon the necessary number of grains 21 is determined by the controller 24 of the apparatus 1 and sent to the processing machine 2. Of course, the number of grains 21 can also be transmitted, or everything can be preset and stored in the system, so that only a request signal is sent.

In principle, it can be said that the throughput of individual grains 21 occurs through the defined dosing time, and that the resulting rotational speed or the grain discharge frequency is selected depending on the processing requirement. It is thereby possible that corresponding sensors, in particular an optical high-speed detection means or sensor 32, can be used to determine the reliability against failure and control accordingly to prevent said failure. If no optical high-speed detection means is installed, a calibrating function must be provided. This calibrating function is necessary if the system is operated without a load cell, and a reliability against failure is determined using different rotational speeds. In addition, a grain-to-weight ratio for further dosing is established via the calibration. For this purpose, a semi-automatic operation multiple dosing samples are dosed at different rotational speeds. Once the dosing weights of the samples of the bulk material or grains 21 is entered, a dosing curve is calculated and is automatically used for the physical adjustment of the dosing parameters, in particular the rotational speed.

If an optical sensor for grain detection is installed, a relationship for the ratio of grain 21 to weight must also be communicated to the controller 240. The reliability against failure is in this case optically evaluated, and can accordingly have an immediate effect on the dosing-regulation process and, if necessary, compensate for a shortage.

Furthermore, FIG. 1 illustrates in dashed lines a housing 33 to which the housing sections 7, 8 are attached. The housing 33 is used to accommodate the additional components, such as the stepper motor 12, the compressor 18, lines, etc. Of course, it is also possible that all components are integrated into the housing sections 7, 8 so that no additional housing 33 is required.

In the exemplary embodiment shown, the position of the blow-off nozzle 17 is arranged at the highest point of the singulating disk 3, wherein this point can also be located between this and the maximum fill level of the granular material reservoir 20. As a result, there is more space for scraping off adhering grains 21 or for aligning the grains 21. It is possible, for example, that in the front housing section 7 with the granular material reservoir 20, preferably a transparent viewing panel 40 is embodied, as illustrated in FIG. 3.

As can be seen and has already been described above, the singulating disk 3 protrudes into the granular material reservoir 20 in the lower region, in particular in the grain receiving region 15 in which the granulate reservoir 20 is arranged, so that the suction openings 5 arranged such that they are distributed on the circumscribed circle are surrounded by grains 21, and so that the grains 21 are suctioned as a result of the negative pressure, which means that multiple suction openings 5 are arranged in the granular material reservoir 20 at the same time and have contact with the individual grains 21, so that it is ensured that a grain 21 is reliably received at a suction opening 5.

It is thereby also possible that, on the singulating disk 3 for receiving the bulk material, in particular below the grain discharge region 16, a covering element 34, or cover, that is used to close off or cover one or more suction openings 5 and is arranged on the front side or rear side of the singulating disk 3. It is thus achieved that the inflow of air 22 into the open suction openings 5, that is, into those openings in which no more grain 21 has been received, is minimized or prevented. Structurally, the suction covering element 34 can also be replaced or formed by the housing sections 7, 8 or the sealing element 9.

Preferably, the singulating disk 3 for the grain 21 has a diameter of 300 mm. It is also possible that, if the system is appropriately sized, larger diameters, preferably between 200 mm and 1000 mm or more, of the singulating disks 3 can be used.

So that the grains 21 do not remain stuck to one another or so that a type of cavity in the granular material reservoir 20 is not formed by the removal, a stirring or carry-along element 37, or simply referred to as a stirrer or carry-along, or a blade wheel could be used for thoroughly mixing the bulk material 21 or the grains 21 is arranged on the singulating disk 3 for receiving bulk material or on the shaft 6. It is thus achieved that the grains 21 are thoroughly mixed and/or are moved, and therefore that no cavities free of granular material form in the granulate reservoir 20.

To enable grains 21 to be refilled into the granular material reservoir 20 arranged in the housing section 7, the granular material reservoir 20, in particular the grain receiving region 15, is connected to a plastic granular material feed 38 (see FIG. 3), which means that when the fill level falls below a defined range or defined weight, an automatic refilling of bulk material 21 from a supply container 39 to a maximum upper range or weight occurs. It is thereby possible that one or more load cells 40 for measuring the weight of the bulk material 21 contained are arranged in the region of the granulate reservoir 20, or that the entire apparatus 1 is arranged on one or more load cells 40 and/or a weighing device 41 with the one or more load cells 40 (FIG. 3) is arranged for determining the weight of the bulk material 21 filled or of the grains 21. This can constitute a further option, a weight-loss measurement, also called loss-in-weight measurement, for the granular material reservoir; that is, the entire dosing unit 1 or the supply container is weighed gravimetrically and used for the grain/weight ratio.

As schematically illustrated in the exemplary embodiments, the grain scrapers 25 and grain aligners 26 are arranged such that the suctioned grain 21 flows against an object, in particular a surface or edge, and the position of the grain 21 is slightly shifted, wherein the shifting is set, however, such that the grain 21 is not pushed out of the circle circumscribed by the suction openings 5. It is thus achieved that any additional grains 21 adhering to the suctioned grain 21 are scraped off.

It is also possible, for example, that a suction opening 5 is formed by a group of smaller openings. This has the advantage that, with very small grains 21 or a special grain shape, the grains 21 are not partially sucked into the suction openings 5, which can potentially lead to catching or jamming during the blowing-off. It is thereby also possible that the suction openings 5 are provided with corresponding grating (not illustrated) so that a sucking-in of the grain 21 can likewise be prevented.

The singulating disk 3 bears directly against the working seal 9, in particular the sealing element 9, or seal, which in turn is attached, in particular glued, to the housing section 8. In this manner, a leak-proof rotation of the singulating disk 3 and the housing section 8, as shown in FIG. 1, is ensured via the working seal 9.

As illustrated previously, the major advantage of this apparatus is that the most exact dosing is possible, whereby the quality is enormously improved and the costs for a possible overdosing to compensate for a more inaccurate dosing are reduced. In addition to the presently discussed apparatus 1, a further enhancement of the dosing precision at the single-grain level is achieved through the control algorithm with the controller.

Through the use of a quick-action screw system 13, it is achieved that a rapid adaptation of the singulating disk 3 to the grain 21, in particular to the grain sizes that are to be transported, can be carried out, which means that different singulating disks 3 having corresponding suction bores 5 can be used for differently sized grains 21, so that when the bulk material 21 is changed, the singulating disk 3 is also changed at the same time.

As a matter of form, it is noted that the invention is not limited to the embodiments shown, but rather can also include additional embodiments.

The invention claimed is:

1. An apparatus for feeding single grains to one or more processing machines, comprising:
   at least one singulator,
   a granular material reservoir for a bulk material, including any of plastic granular material or plastic pellets or plastic grains, and
   a feeder for feeding the singulated bulk material to the injection molding machine,
   wherein at least two housing sections are arranged around the singulator to form a closed housing, wherein the singulator is formed from a singulating disk,
wherein the singulating disk is provided with suction openings distributed over a pitch circle, and the granular material reservoir is arranged on one side of the singulating disk for receiving bulk material and a negative-pressure generating device for generating a negative pressure in a negative-pressure chamber is arranged or connected on an opposite side,
wherein the singulating disk is mounted on a shaft and coupled with a drive, and, via the shaft, the singulating disk is configured to be rotated with the suction openings to receive the bulk material directly against the singulating disk, and to dispense the bulk material, and a seal is configured to seal the rotating singulating disk,
wherein the singulating disk is provided with suction openings as through bores,
wherein the suction opening is smaller than the grain to be transported,
wherein a grain scraper and/or a grain aligner for the bulk material or grain is arranged to scrape off the grains and/or align the grains.

2. The apparatus according to claim 1, wherein:
the one or more processing machines comprise an injection molding machine, and
in an upper region, a blow-off nozzle is arranged which is connected to the feeder for feeding the singulated grain to the injection molding machine.

3. The apparatus according to claim 1, wherein:
an overpressure opening is arranged in or a blow-off nozzle extends into the grain discharge area region, and
the blow-off nozzle is separated from the negative-pressure chamber.

4. The apparatus according to claim 1, wherein:
the granular material reservoir is connected to a plastic granular material feed.

5. The apparatus according to claim 1, wherein:
the singulating disk for the bulk material has a diameter of maximally 300 mm.

6. The apparatus according to claim 1, wherein:
in a lower area, the singulating disk projects into or is arranged in, respectively, the granular material reservoir.

7. The apparatus according to claim 1, wherein:
a cover for closing one or more suction openings without grains on the front or rear side of the singulating disk is assigned to the singulating disk for bulk intake.

8. The apparatus according to claim 7, wherein:
the cover is assigned to the singulating disk for bulk intake below the grain discharge area.

9. The apparatus according to claim 1, wherein:
the one or more processing machines comprise an injection molding machine.

10. The apparatus according to claim 1, wherein:
the bulk material comprises plastic granular material, plastic pellets or plastic grains.

11. The apparatus according to claim 1, wherein:
the granular material reservoir is arranged in a lower grain receiving region, and the negative-pressure generating device comprises a compressor.

12. The apparatus according to claim 1, wherein:
the drive comprises a stepper motor.

13. The apparatus according to claim 2, wherein:
the feed device comprises a supply line for feeding the singulated grain to the injection molding machine.

14. The apparatus according to claim 2, wherein:
the upper region in which the blow-off nozzle is arranged is in the grain discharge region of the singulating disk.

15. The apparatus according to claim 4, wherein:
the granular material reservoir is arranged in a grain receiving region and the plastic granular material feed is an automatic plastic granular material feed.

16. An apparatus for feeding single grains to one or more processing machines, comprising:
at least one singulator,
a granular material reservoir for a bulk material, and
a feeding device for feeding the singulated bulk material to the injection molding machine,
wherein at least two housing sections are arranged around the singulator to form a closed housing,
wherein the singulator is formed from a singulating disk,
wherein the singulating disk is provided with suction openings distributed over a pitch circle, and the granular material reservoir is arranged on one side of the singulating disk for receiving bulk material and a negative-pressure generating device for generating a negative pressure in a negative-pressure chamber is arranged or connected on an opposite side,
wherein the singulating disk is mounted on a shaft and coupled with a drive, and, via the shaft, the singulating disk is configured to be rotated with the suction openings to receive the bulk material directly against the singulating disk, and to dispense the bulk material, and a seal is configured to seal the rotating singulating disk,
wherein the singulating disk is provided with suction openings as through bores,
wherein the suction opening is smaller than the grain to be transported,
wherein a stirrer or a carry-along is arranged on the singulating disk for receiving the bulk material or on the shaft or one or more load cells for measuring the weight of the bulk material contained are arranged in the region of the granular material reservoir, or wherein the entire apparatus is arranged on load cells or on a weighing device for determining the weight of the bulk material filled or of the grains or of the entire apparatus.

* * * * *